United States Patent [19]
Yamamuro

[11] Patent Number: 5,818,609
[45] Date of Patent: Oct. 6, 1998

[54] FACSIMILE APPARATUS TRANSMITTING IMAGE DATA RECEIVED FROM EXTERNAL COMPUTER

[75] Inventor: Soichi Yamamuro, Tokyo, Japan

[73] Assignee: Canon Kabushiki Kaisha, Tokyo, Japan

[21] Appl. No.: 230,519

[22] Filed: Apr. 20, 1994

[30] Foreign Application Priority Data

Apr. 22, 1993 [JP] Japan .................................. 5-095990

[51] Int. Cl.⁶ .................................................. H04N 1/32
[52] U.S. Cl. ...................... 358/468; 358/404; 358/442; 358/444; 370/229
[58] Field of Search ................................... 358/400, 437, 358/438, 439, 441–444, 468, 404; 395/113–115; 355/206, 207, 208, 246; 399/18–19, 82–83; 370/235, 229; H04N 1/32

[56] References Cited

U.S. PATENT DOCUMENTS

| | | | |
|---|---|---|---|
| 4,907,094 | 3/1990 | Mishima et al. ........................ | 358/404 |
| 4,920,427 | 4/1990 | Hirata .................................... | 358/437 |
| 5,008,949 | 4/1991 | Arimoto . | |
| 5,257,117 | 10/1993 | Kang et al. .............................. | 358/442 |
| 5,267,048 | 11/1993 | Hirai ...................................... | 358/437 |
| 5,289,582 | 2/1994 | Hirata et al. ............................ | 395/275 |
| 5,311,327 | 5/1994 | Fukushima et al. .................... | 358/444 |
| 5,315,403 | 5/1994 | Hirai et al. .............................. | 358/444 |
| 5,428,458 | 6/1995 | Aiba et al. .............................. | 358/468 |
| 5,457,544 | 10/1995 | Ochiai .................................... | 358/444 |
| 5,459,584 | 10/1995 | Gordon et al. .......................... | 358/440 |
| 5,530,554 | 6/1996 | Maehara ................................. | 358/442 |
| 5,581,373 | 12/1996 | Yoshida .................................. | 358/468 |

Primary Examiner—Edward L. Coles
Assistant Examiner—Madeleine AV Nguyen
Attorney, Agent, or Firm—Fitzpatrick, Cella, Harper & Scinto

[57] ABSTRACT

A facsimile apparatus comprises an interface unit for a host computer, a memory for storing image data transferred from the host computer through the interface unit and a control unit for interrupting and resuming the interface operation with the host computer. The control unit interrupts the interface operation and temporarily stops the transfer of the image data from the host computer when a detection unit detects that image data stored in the memory during the transmission of the image data from the host computer has reached a predetermined volume.

16 Claims, 6 Drawing Sheets

FACSIMILE APPARATUS TRANSMITTING IMAGE DATA RECEIVED FROM EXTERNAL COMPUTER

BACKGROUND OF THE INVENTION

1. Field of the Invention

The present invention relates to a facsimile apparatus having interface means with a computer device such as a personal computer or a work station.

2. Related Background Art

In a prior art facsimile apparatus having an interface with a computer, when data received from the computer is to be transmitted to another device through a communication line, one communication package of data received from the computer is stored in the facsimile apparatus and is then transmitted to the other device.

However, in the prior art apparatus, since the image data to be transmitted to the other device is temporarily stored in a memory of the facsimile apparatus before it is transmitted, the following disadvantages are encountered.

1) In a facsimile apparatus which does not have a large capacity memory such as a hard disk, the memory immediately becomes full when the apparatus interfaces with the computer device because of the small capacity of the memory, and this lacks the utility.

2) It is not possible to transmit larger image data than the capacity of the memory of the facsimile apparatus.

SUMMARY OF THE INVENTION

It is an object of the present invention to improve a facsimile apparatus in the light of the above problems.

It is another object of the present invention to provide a facsimile apparatus having interface means with a computer device, which will efficiently utilize image data memory means in the facsimile apparatus.

It is another object of the present invention to provide a facsimile apparatus having interface means with a computer device, which can efficiently transmit image data received from the computer device to a public line.

It is still another object of the present invention to provide a facsimile apparatus having interface means with a computer device which can receive image data of a larger volume than the memory capacity of image data memory means of facsimile apparatus from the computer device and transmit it to a public line.

DETAILED DESCRIPTION OF THE PREFERRED EMBODIMENTS (Embodiment 1)

One embodiment of the present invention is now explained with reference to the drawings.

Figure 1:
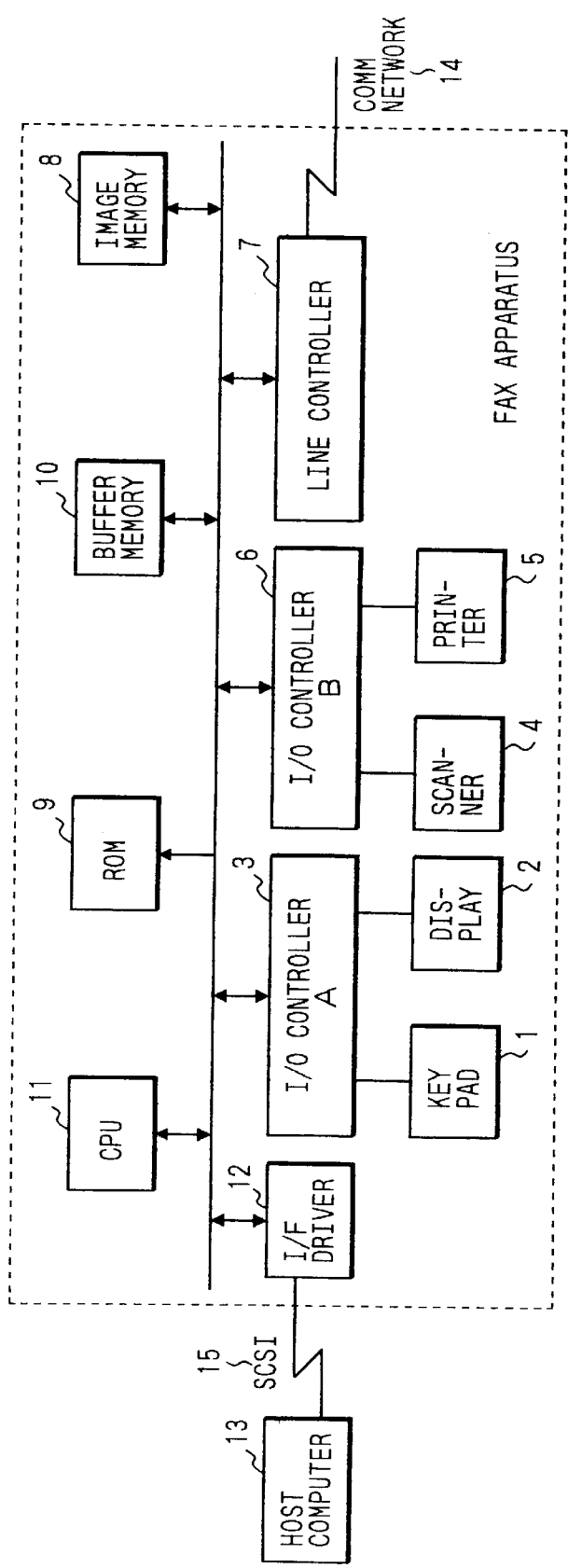
FIG. 1 shows a block diagram of a facsimile apparatus in accordance with a first embodiment of the present invention.

FIG. 1 shows a block diagram of one embodiment of the present invention. A facsimile apparatus of the present embodiment shown in FIG. 1 comprises a key pad 1 having a ten-key array and other switches to be operated by an operator, a display device 2 for displaying a status of the apparatus to the operator, an I/O controller 3 for controlling the key pad 1 and the display device 2, a reader (scanner) 4 including an optical system for reading a document sheet to be transmitted and a CCD line sensor, a printer 5 for permanently visualizing a received document, another I/O controller 6 for controlling the scanner 4 and the printer 5, a line control unit 7 for controlling the communication with a communication network 14, an image memory 8 for buffering encoded data to be transmitted, a read-only memory (ROM) 9 which stores a program for controlling the entire function of the facsimile apparatus shown in FIG. 2 (hereinafter simply referred to as the apparatus), a buffer memory 10 used for the general processing in the present embodiment, a microprocessor (CPU) 11 which is a main control unit for controlling the entire apparatus in accordance with the program stored in the ROM 9, and an interface driver 12 for interfacing with a host computer (hereinafter simply referred to as a host) 13.

In the present embodiment, a known SCSI (Small Computer System Interface) 15 is used as an interface bus to connect the host 13 to the apparatus.

Operation of the present embodiment is explained with reference to FIGS. 2 and 3. The SCSI 15 and the communication line 14 are based on a procedure in accordance with a known communication protocol, and the explanation thereof is omitted.

Figure 2:
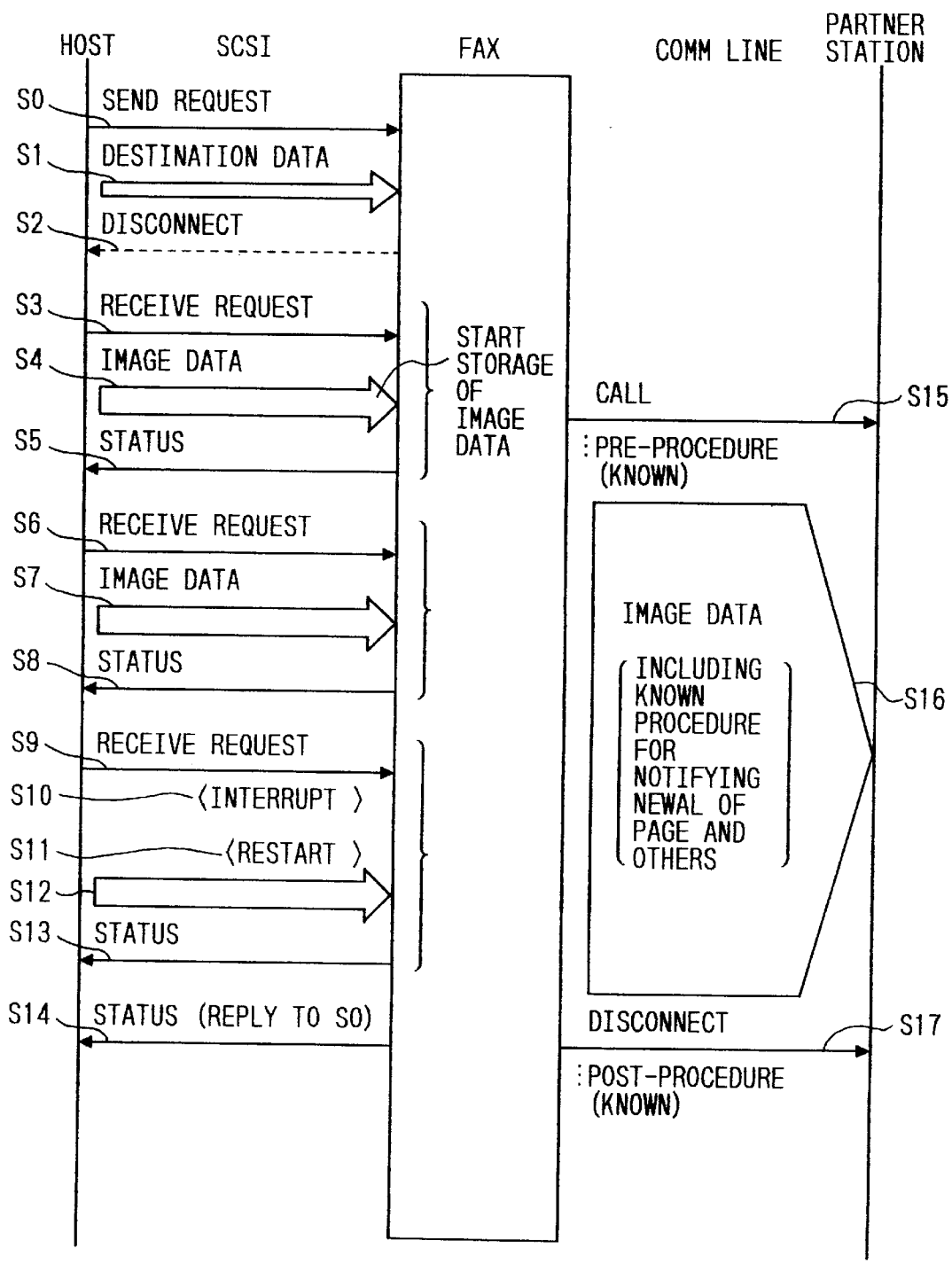
FIG. 2 shows a timing chart of that embodiment.
Figure 3:
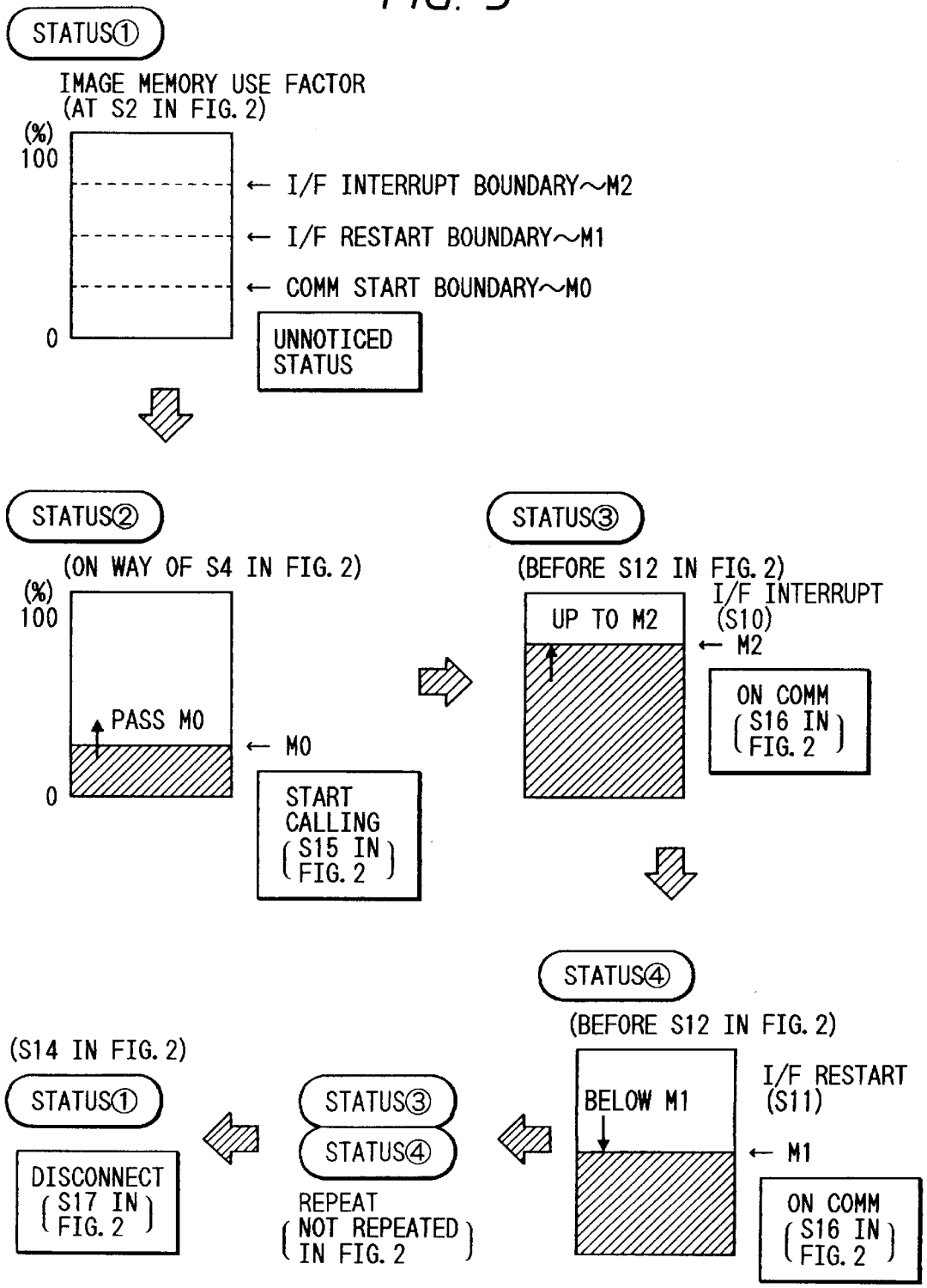
FIG. 3 shows the usage of an image memory.

In FIG. 2, a "send request" command S0 is transmitted from the host 13 through the SCSI bus 115. Destination data (address data) S1 including information such as destination station dial number required for the transmission is sent from the host 13. When the send request command is received by the interface driver 12, the CPU 11 checks resources to be used. Namely, the CPU 11 determines whether the communication line 14 is busy, whether the SCSI bus 15 is busy and whether the memory capacity of the image memory 8 is sufficient to determine thereby, whether the facsimile apparatus is ready to respond to the send request is checked.

If the CPU 11 determines that the apparatus is ready to respond to the send request command S0, a DISCONNECT signal is sent to the host after the reception of the address data S1 to shift a right to use the SCSI bus 15 to the host. On the other hand, when the CPU 11 determines that the apparatus is not ready to respond to the send request, an acknowledge signal indicating a busy state is sent back after the reception of the address data command S1. The acknowledge signal indicating the busy state is of the same type as that of the acknowledgment S14 to the send request S0 to be described later.

When the CPU 11 determines that the apparatus is ready to respond to the send request command S0, the apparatus does not send back the acknowledgment to the send request S0 until the communication is completed. Thus, the SCSI bus 15 is left open (S2) so that the image data from the host may be accepted during that period. The use factor of the image memory 8 of the facsimile apparatus at this time point is 0% (state 1 in FIG. 3). When the image data has already been stored in the image memory 8, the remaining memory capacity is set to 100%.

An image receive request command S3 is then send from the host 13. The facsimile apparatus receives the image data transfer S4 following to the command and stores it in the image memory 8 of the facsimile apparatus. If image data is stored up to a preset start of communication boundary (M0 in FIG. 3) during the storage of the image data (state 2 in FIG. 3), a call is made to the communication line 14 (S15). After the start of the communication, the image data sent to the destination station is deleted from the image memory 8.

When all image data S4 transferred from the host 13 have been stored in the image memory 8 of the apparatus, an end response S5 is sent back to the host 13. Then, an image receive request command S6 is received from the host 13 to store the continued image data S7. If the rate of the image data transmission S16 to the communication line 14 is slower than the image transfer rate from the host 13, the storage of the image data from the host proceeds faster than the erasure of the transferred image data from the image memory 8, and the use factor of the image memory 8 rises (from state 2 to state 3 in FIG. 3).

When the use factor of the image memory 8 reaches a preset i/f (interface) interrupt boundary (M2 in FIG. 3) (state 3 in FIG. 3), the SCSI 15 is interrupted under the control of the interface driver 12 to temporarily stop the storage of the image data.

The interruption of the SCSI 15 is now explained. In the SCSI, the image data is sent back from the host to the facsimile apparatus one byte at a time. If the facsimile apparatus is ready to receive next one byte of image data when the facsimile apparatus has completed the reception of one byte of image data, it sends back an acknowledgment signal through the interface driver 12. On the other hand, if it is not ready to receive the next byte of image data, it does not send back the acknowledgment signal. The host does not send the next byte of image data until the acknowledgment data is sent back. In this manner, the facsimile apparatus can interrupt the SCSI 15 by not sending the acknowledgment signal after the completion of reception of one byte of data.

In FIG. 2, the interruption reaches the i/f interruption boundary (M2 in FIG. 3) at the end of the image data S7. When it reaches during the transfer of the image data, the bus 15 may also be interrupted under the control of the interface driver 12 in a similar manner. Since only the communication operation is carried out during the i/f interruption, the use factor of the image memory 8 reduces (between state 3 and state 4 in FIG. 3). When the use factor of the image memory 8 decreases to a preset i/f resume boundary (M1 in FIG. 3), the SCSI 15 is resumed under the control of the interface driver 12 (S11) to continue the storage of the image data (S12). Thereafter, since the image data storage rate is faster than the communication rate, the use factor of the image memory 8 rises. The use factor continues to rise so long as the image data is transferred from the host 13, and when the i/f interruption boundary (M2 in FIG. 3) is reached again, the above process is repeated. When all image data from the host 13 have been transferred and the communication of the image data left in the memory 8 is completed (S17), an acknowledgment S14 to the initial send request command S0 is sent back.

If the destination station requests the interruption during the communication by some reason, or an abnormal condition is detected in the destination station or any fault occurs in the facsimile apparatus of the present embodiment and the communication is to be interrupted, and if the transfer of the image data of the interface is on the way (the transfer in process (S4), (S7), (S12) or interruption in process (S10), or between the processes of the image receive request command (S3), (S6), (S9)), the processing of the interface is interrupted. If the image data transfer is in process, the transfer is interrupted under the control of the interface driver 12, and if the interruption is in process like S10 of FIG. 2, the interface is not resumed under the control of the interface driver 12 and the acknowledgment to the image receive request command is sent back. After the acknowledgment to the image receive request command (S5, S8 or S13 in FIG. 2) is sent back, the acknowledgment S14 to the send request command S0 is immediately sent back.

If uncommunicated image data which has been transferred from the host 13 to the image memory 8 of the apparatus remains after the error process for the abnormal state described above, the image data is erased from the image memory 8.

In accordance with the present embodiment, in the facsimile apparatus having the interface with the host computer, image data of a larger volume than the memory capacity of the image memory can be received from the host computer and sent to the line without providing a large capacity image memory such as a hard disk.

Figure 5:
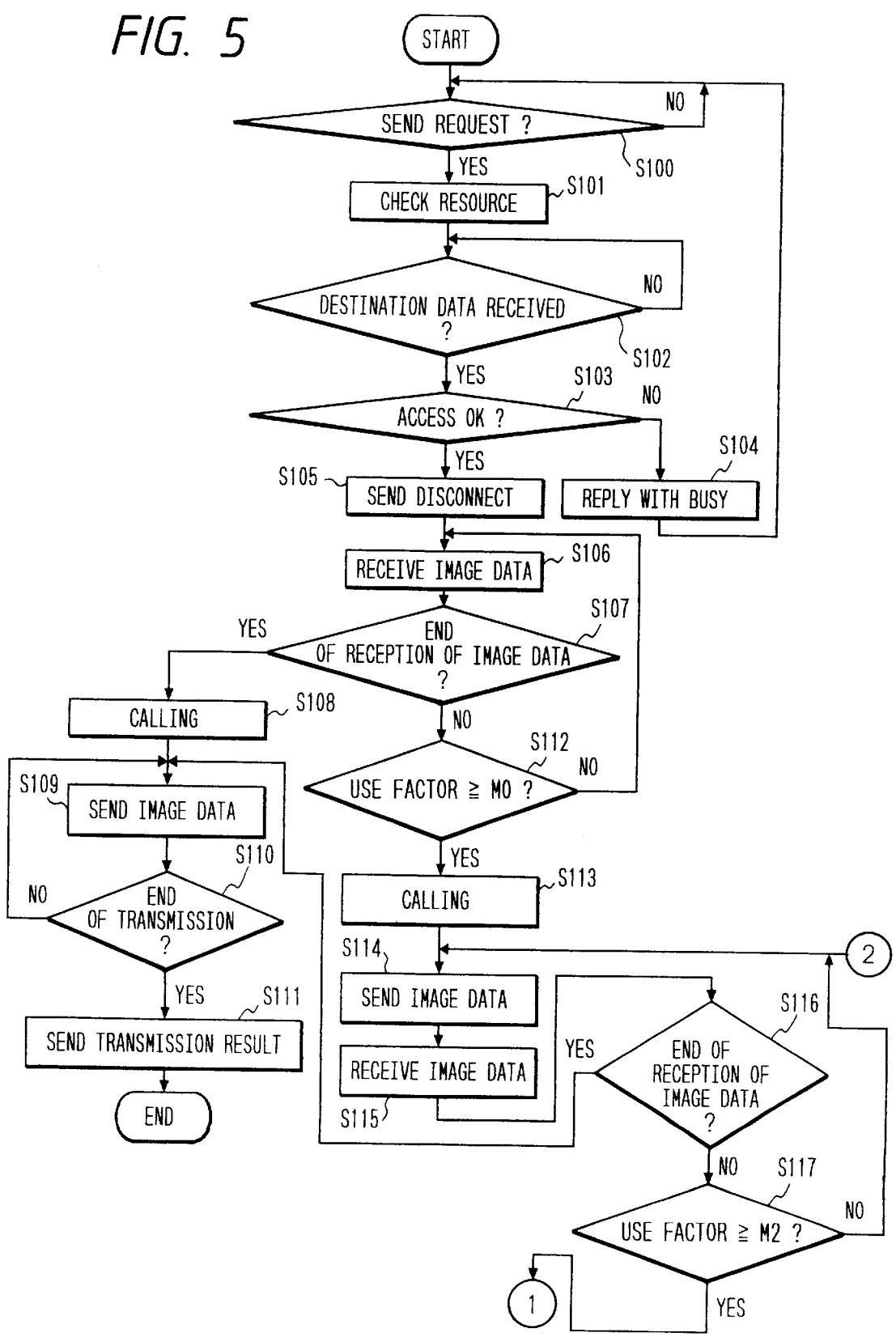
Figure 6:
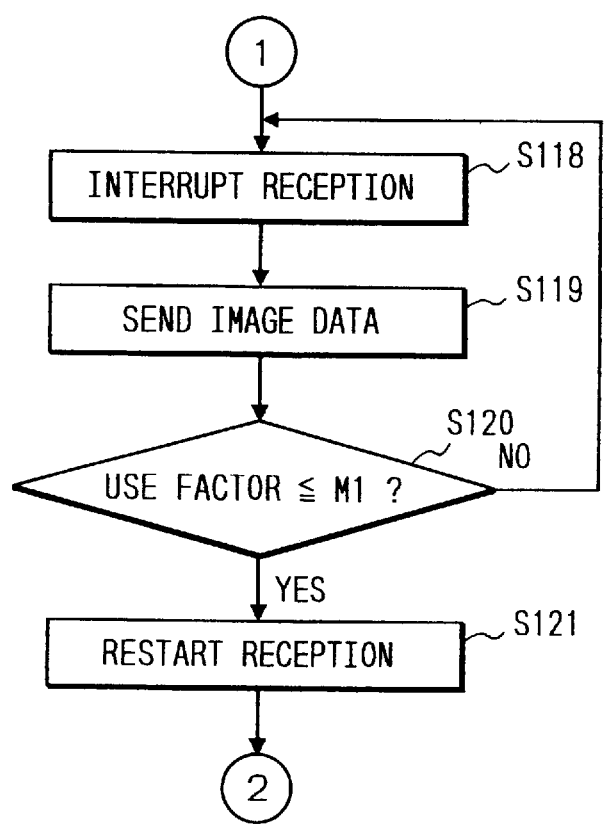

Referring to FIGS. 5 and 6, the operation of the CPU 11 is explained.

In a step S100, the reception of a send request command from the host is monitored.

When the send request command from the host is detected in the step S100, a resource check is conducted in a step S101 to determine whether the communication network 14, the image memory 8 and the SCSI bus 15 are available or not.

In a step S102, the reception of address data from the host is monitored, and if the address data is received, the process proceeds to a step S103.

In the step S103, whether the apparatus is ready to operate in response to the send request from the host or not, is determined based on the result of the resource check of the step S101. If it is ready, the process proceeds to a step S105. If it is not ready, a busy acknowledgment is sent back to the host in a step S104, and the process returns to the step S100.

In the step S105, a DISCONNECT signal indicating that the image data is receivable from the host is sent to the host.

In a step S106, the image data sent from the host is received.

In a step S107, the reception of the image data is monitored, and when the reception of the image data is completed, the process proceeds to a step S108, and if the reception of the image data is not completed, the process proceeds to a step S112.

In the step S108, a call is made to the address received in the step S102.

In a step S109, the image data stored in the image memory 8 is sent to the called address.

In a step S110, the completion of the transmission of the image data stored in the image memory 8 is monitored, and if the completion is detected, the process proceeds to a step S111, and if the completion is not detected, the process returns to the step S109.

In the step S111, a result of the communication of the image data to the called address is sent to the host.

In a step S112, a use factor of the image memory 8 is detected, and if the use factor is no smaller than $M_0$, the process proceeds to a step S113, and if the use factor is smaller than $M_0$, the step returns to the step S106.

In the step S113, a call is made to the address received from the host in the step S102.

In a step S114, the image data stored in the image memory 8 is sent to the called address.

In a step S115, the image data is received from the host.

In a step S116, the reception of the image data sent from the host is monitored to detect completion of the reception, and once it is completed, the process proceeds to the step S109, and which it is not completed, the process proceeds to a step S117.

In the step S117, whether the use factor of the image memory 8 is no smaller than $M_2$, is determined, and if it is, the process proceeds to a step S118 (FIG. 6), and otherwise, the process returns to the step S114.

In a step S118, the reception of the image data sent from the host is interrupted.

In a step S119, the image data stored in the image memory 8 is sent.

In a step S120, whether the use factor of the image memory 8 is no larger than $M_1$ or not is determined, and if it is, the process proceeds to a step S121 and if it is not, the process returns to the step S118.

The reception of the image data in the steps S106 and S115 of FIGS. 5 and 6 is effected byte by byte, and the transmission of the image data in the steps S109, S114 and S119 is effected byte by byte in accordance with the transmission status of the image data to the communication network 14.

(Embodiment 2)

In the first embodiment, the interface between the host 13 and apparatus uses vendor unique commands in accordance with the known SCSI (Small Computer System Interface), but other commands (requisite commands, optional commands and vendor unique commands) which follow the SCSI protocol may also be used to effect the same process.

For example, the embodiment of FIG. 2 uses the multi-task operation of the SCSI commands (for example, a series of steps S3, S4 and S5 are staggered in one of the steps S0–S14). Alternatively, the same effect may be attained in some cases without the multi-task operation.

(Embodiment 3)

In the first and second embodiments, the known SCSI is used as the interface between the host 13 and the facsimile apparatus. Alternatively, other interface devices may be used to attain the same effect.

Figure 4:
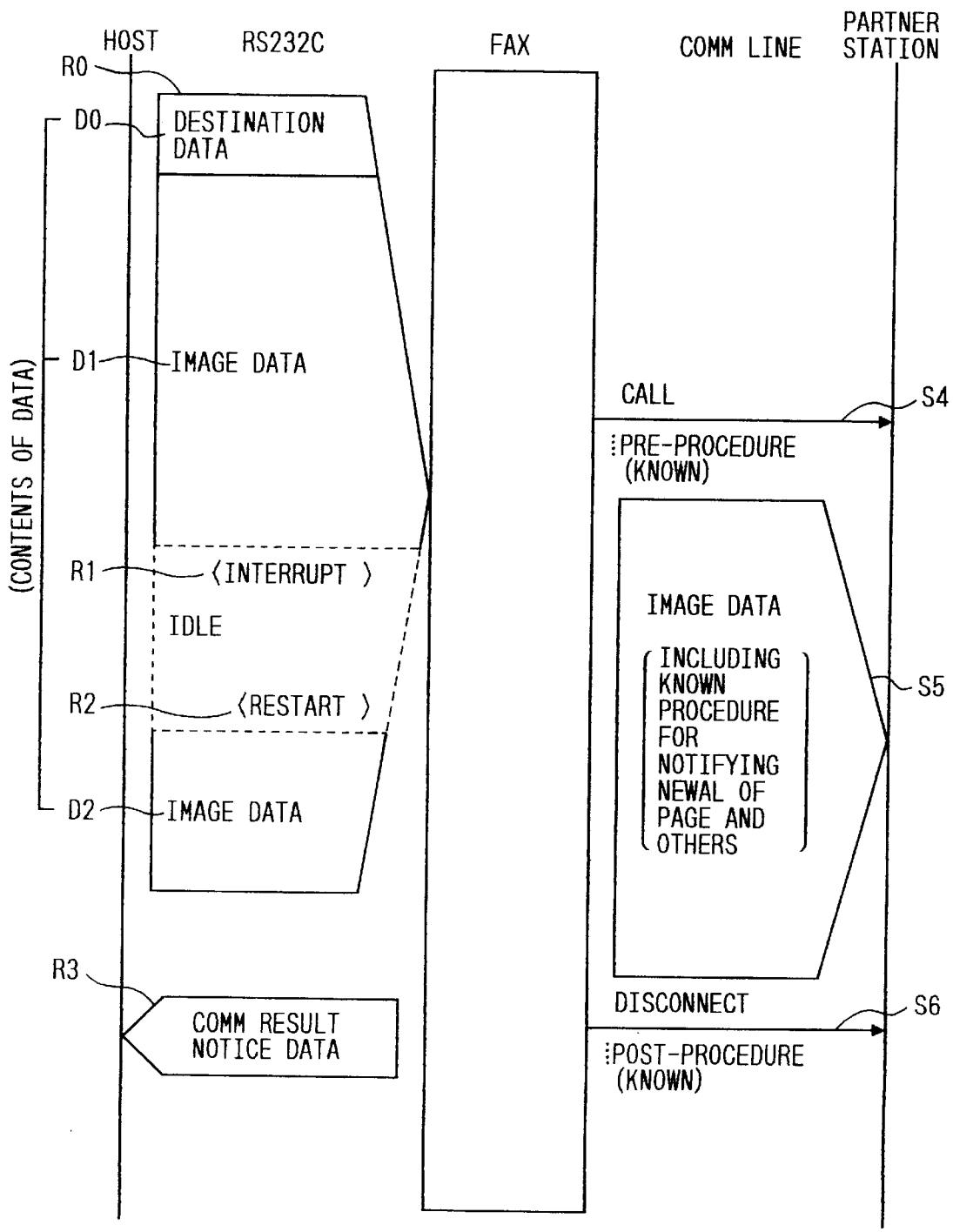
FIG. 4 shows a timing chart of another embodiment and FIGS. 5 and 6 together form a flow chart showing an operation of CPU 11 in the first embodiment.

FIG. 4 shows an embodiment which uses a known RS232C. Address data D0 and image data D1 are received from the host through the RS232C. As the image data is stored in the image memory in the facsimile apparatus and the stored image data reaches the start of communication boundary $M_1$, a call is made to the communication line 14 (R4) as is done in the first embodiment. If the image data increased by the storage of the image data from the RS232C is larger than the image data in the image memory 8 which is reduced as the transmission to the communication line proceeds, the relative use factor of the image memory 8 increases. When it reaches the i/f interruption boundary $M_2$, the reception of the image data is interrupted in accordance with the protocol of the RS232C (R1). When the use factor of the image memory reduces to the i/f resume boundary $M_0$ as the communication proceeds, the transfer through the RS232C is resumed. FIG. 4 shows a case in which the interruption and the resumption each occur only once. The above process is continued and when the communication is completed (R6), the apparatus sends back the communication result data to the host 3 (R3).

Other interface than the SCSI may be used to attain the same effect.

(Embodiment 4) In the embodiments described above the use factor of the image memory by the image data is used as a base to determine the start of communication boundary $M_0$, the i/f interruption boundary $M_2$ and the i/f resume boundary $M_1$. Alternatively, another base may be used to attain the same effect.

For example, actual data of the image data length in the image memory may be used as the base. Namely, a function to detect the data length if the image data stored in the image memory of the facsimile apparatus is provided, and image data lengths are assigned to the start of communication boundary, the i/f interruption boundary and the i/f resume boundary. The image data length in the image memory is always monitored during the operation, and when the boundary is reached, the process is effected in the same manner as that of the previous embodiments. In this manner, the same effect is attained.

(Embodiment 5)

In the embodiment 4, the image data length is used as the base to determine the boundaries. Alternatively, a time may be used to attain the same effect.

Namely, if the transfer rate between the host 13 and the apparatus and the communication rate through the communication line 14 are known, the start of communication boundary, the i/f interruption boundary and the i/f resume boundary may be determined by using the time intervals in the operation as the base.

(Embodiment 6)

In the foregoing embodiments, the use factor of the image memory, the actual image data length and the time interval are used as the bases to determine the boundaries. Those bases may be provided for each boundary to attain the same effect.

In accordance with the present invention, in the facsimile apparatus having the interface with the host computer, the communication is started when it is determined that the image data transferred from the host computer and stored in the image data memory of the facsimile apparatus has reached the predetermined volume, and the transmission of the image data is started. The transmitted image data is deleted from the image memory.

If the transfer rate of the image data from the host computer is faster than the transmission rate from the facsimile apparatus and the image data stored in the image memory increases, the interface with the host computer is interrupted when the image data stored in the image memory reaches the predetermined volume. Then, when the image memory is evacuated as the communication proceeds and the image data reaches the predetermined volume, the interrupted interface is resumed. If the image data in the image memory increases, the interface is interrupted. This process is repeated.

In this manner, even in a facsimile apparatus having a small capacity of image data memory, the image data transferred from the host computer may be sent while it is stored, and the performance of the facsimile apparatus is improved.

Further, since the image data is transmitted while it is in image memory, the communication is effected without keeping the destination station waiting, and prolongation of the communication time is prevented.

When the communication is interrupted, the transfer of the image data from the host computer is also interrupted, if the image data is left in the image memory at that time, the image data is deleted to eliminate the necessity of the post process by the host computer due to the interruption, and the function and the reliability of the overall system are improved.

What is claimed is:

1. A facsimile apparatus comprising:

interface means for receiving image data from an external host computer;

memory means for storing image data received from the external host computer through said interface means;

calling means for calling a destination station;

transmitting means for transmitting the image data stored in said memory means to the destination station;

control means for controlling said interface means such that the transmission by said transmitting means and the reception of the image data from the external host computer by said interface means are performed concurrently, wherein said control means controls said interface means such that said interface means starts to receive the image data before said calling means starts calling for transmission; and detection means for detecting an amount of the image data stored in said memory means, wherein said control means interrupts reception of the image data from the host computer when said detection means detects that image data stored in said memory means during the reception of the image data from the external host computer has reached a first predetermined volume.

2. A facsimile apparatus according to claim 1, wherein said control means resumes receiving the image data from the external host computer when said detection means detects that the image data stored in said memory means has fallen below a second predetermined volume as the transmission by said transmitting means proceeds and the image data stored in said memory means decreases.

3. A facsimile apparatus comprising:

interface means for receiving image data from an external host computer;

memory means for storing image data received from the external host computer through said interface means;

calling means for calling a destination station;

transmitting means for transmitting the image data stored in said memory means to the destination station; and control means for controlling said interface means such that the transmission by said transmitting means and the reception of the image data from the external host computer by said interface means are performed concurrently, wherein said control means controls said interface means such that said interface means starts to receive the image data before said calling means starts calling for transmission, and wherein said control means invalidates the image data in said memory means which was to be transmitted if such image data is left when the transmission by said transmitting means is interrupted.

4. A facsimile apparatus according to claim 1, wherein said control means starts to transmit the image data by said transmitting means when said detection means detects that the image data received from the external host computer through said interface means has reached a third predetermined volume.

5. A facsimile apparatus according to claim 1, further comprising deleting means for deleting image data which has been transmitted to the destination station from said memory means.

6. A facsimile apparatus comprising:

interface means for receiving image data from an external computer for obtaining image data to be transmitted;

memory means for storing the image data supplied from said interface means;

transmission means for transmitting the image data stored in said memory means to a second device through a communication line; and control means for detecting a transmission error occurring in transmission of the image data through the communication line, for informing the external computer of termination of that transmission of the image data by the transmission error through said interface means, and for invalidating the image data stored in said memory means responsive to the transmission error.

7. A facsimile apparatus according to claim 6, wherein the transmission operation by said transmission means and the receiving operation by said interface means are performed concurrently.

8. A facsimile apparatus according to claim 7, further comprising calling means for calling the second device for the transmission operation, wherein said calling means calls the second device after said memory means stores a predetermined amount of the image data.

9. A method of facsimile communication, comprising the steps of:

receiving image data from an external host computer through an interface means;

storing, in a memory means, image data received from the external host computer in said receiving step;

calling a destination station;

transmitting the image data stored in said storing step to the destination station;

controlling the interface means such that the transmission in said transmitting step and the reception of the image data from the external host computer in said receiving step are performed concurrently; and detecting an amount of image data stored in said storing step, wherein, in said controlling step, reception of the image data from the host computer is interrupted when, in said detecting step, it is detected that image data stored in said storing step during said receiving step has reached a first predetermined volumes, wherein said controlling step includes controlling the interface means such that the interface means starts to receive the image data before said calling step is performed to call for transmission.

10. A method according to claim 9, wherein, in said controlling step, reception of the image data from the external host computer is resumed when it is detected, in said detecting step, that the image data stored in said storing step has fallen below a second predetermined volume as the transmission in said transmitting step proceeds and the amount of image data which has been stored decreases.

11. A method of facsimile communication comprising the steps of:

receiving image data from an external host computer through an interface means;

storing, in a memory means, image data received from the external host computer in said receiving step;

calling a destination station;

transmitting the image data stored in said storing step to the destination station; and controlling the interface means such that the transmission in said transmitting step and the reception of the image data from the external host computer in said receiving step are performed concurrently, wherein said controlling step includes controlling the interface means such that the interface means starts to receive the image data before said calling step is performed to call for transmission, and wherein, in said controlling step, any image data left in the memory means which was to be transmitted is invalidated, if any such image data is left when the transmission in said transmitting step is interrupted.

12. A method according to claim 9, wherein, in said controlling step, performance of said transmitting step is started when it is detected, in said detecting step, that the image data received from the external host computer through the interface means has reached a third predetermined volume.

13. A method according to claim 9, further comprising the step of deleting from the memory means, image data which has been transmitted to the destination station.

14. A facsimile method, comprising the steps of:

receiving, through interface means, image data from an external computer for obtaining image data to be transmitted;

storing, in a memory means, the image data supplied from the interface means in said receiving step;

transmitting the image data stored in said storing step to a second device through a communication line; and detecting a transmission error occurring in transmission of the image data through the communication line, informing the external computer of termination of that transmission of the image data by the transmission error through the interface means, and invalidating the image data stored in said memory means responsive to the transmission error.

15. A method according to claim 14, wherein transmission in said transmitting step and receiving in said receiving step are performed concurrently.

16. A method according to claim 14, further comprising the step of calling the second device for transmission, wherein, in said calling step, the second device is called after a predetermined amount of the image data is stored in said storing step.

* * * * *

UNITED STATES PATENT AND TRADEMARK OFFICE
CERTIFICATE OF CORRECTION

PATENT NO. : 5,818,609
DATED : October 6, 1998
INVENTOR(S) : SOICHI YAMAMURO

Page 1 of 2

It is certified that error appears in the above-identified patent and that said Letters Patent is hereby corrected as shown below:

COLUMN 1

Line 26, "this lacks the utility." should read
--thus lacks utility.--; and
Line 55, "embodiment" should read --embodiment,--.

COLUMN 2

Line 29, "a"send request" should read
--a "send request"--;
Line 62, "send" should read --sent--; and
Line 64, "to" should be deleted.

COLUMN 4

Line 66, "and which it" should read --while if it--.

COLUMN 5

Line 59, "(Embodiment 4) In" should read --(Embodiment 4)
¶ In--; and "above" should read --above,--; and
Line 62, "$M_2$and" should read --$M_2$ and--.

COLUMN 6

Line 48, "the" should be deleted.

UNITED STATES PATENT AND TRADEMARK OFFICE
CERTIFICATE OF CORRECTION

PATENT NO. : 5,818,609

DATED : October 6, 1998

INVENTOR(S) : SOICHI YAMAMURO

It is certified that error appears in the above-identified patent and that said Letters Patent is hereby corrected as shown below:

COLUMN 8

Line 32, "volumes," should read --volume,--.

Signed and Sealed this

Eighth Day of June, 1999

Attest:

Q. TODD DICKINSON

*Attesting Officer*  *Acting Commissioner of Patents and Trademarks*